United States Patent [19]

Imura et al.

[11] 4,077,042
[45] Feb. 28, 1978

[54] CONTROL MEANS FOR PHOTOFLASH PHOTOGRAPHY SYSTEM

[75] Inventors: Toshinori Imura, Sakai; Keisuke Maeda, Osaka; Mikio Naya, Izumi, all of Japan

[73] Assignee: Minolta Camera Kabushiki Kaisha, Osaka, Japan

[21] Appl. No.: 703,490

[22] Filed: Jul. 8, 1976

[30] Foreign Application Priority Data

Jul. 11, 1975  Japan ................................ 50-85685

[51] Int. Cl.² ........................... G03B 7/00; G03B 15/05
[52] U.S. Cl. ........................................ 354/21; 354/33; 354/60 F; 354/145
[58] Field of Search ............... 354/21, 32, 33, 60 F, 354/34, 145

[56] References Cited

U.S. PATENT DOCUMENTS

| 3,176,599 | 4/1965 | Anwyl | 354/21 |
| 3,410,187 | 11/1968 | Kaneko | 354/21 |
| 3,648,104 | 3/1972 | Ackermann | 354/33 X |
| 3,667,363 | 6/1972 | Tanaka | 354/21 |
| 3,742,828 | 7/1973 | Nakajima et al. | 354/33 |

*Primary Examiner*—L. T. Hix
*Assistant Examiner*—M. L. Gellner
*Attorney, Agent, or Firm*—Wolder & Gross

[57] ABSTRACT

A photoflash photography system includes a camera separably housing individual film cartridges carrying indicia, physical or electrical, representing the sensitivity of the film contained in the respective cartridge. A photoflash unit is coupled to the camera and has a light output which automatically varies inversely with the film sensitivity in response to the sensitivity indicia. The light output is varied by varying the charge voltage on the flash tube storage capacitor or the capacitor capacitance value. The electrical indicia may be resistors of different values and the physical indicia may be recesses of different depths or differently disposed shoulders or fingers which are detected by movable sensing members.

8 Claims, 11 Drawing Figures

CONTROL MEANS FOR PHOTOFLASH PHOTOGRAPHY SYSTEM

BACKGROUND OF THE INVENTION

The present invention relates generally to improvements in photoflash photography and it relates more particularly to an improved photoflash photography apparatus in which the light output of an electronic photoflash unit is automatically adjusted in accordance with the sensitivity of the film with which the camera is loaded.

In the practice of photoflash photography many parameters must be relatively adjusted and these include the camera diaphragm aperture, the object camera distance and the amount of light emitted by the photoflash device. Hitherto, the adjustment for the film sensitivity has generally been effected by the manual adjustment of a setting member which is provided in the camera or the flash unit. In this connection, the setting member is provided on the flash unit or device in the case where a calculating dial for determining a suitable aperture value based on the camera-object distance is provided for the flash unit or the flash device has an automatic control device for controlling the time interval during which the flash is being fired. In the alternative, the setting member is provided on a camera in case the camera is provided with means for automaticallly controlling the diaphragm aperture commensurate with the camera-object distance through mechanical interconnection of a focus adjusting member and the diaphragm setting member. However, such manual setting system is unreliable in that an operator may fail to change the film sensitivity setting with changes in sensitivity of film used in the camera, resulting in defective exposure. It is accordingly clear that the conventional photoflash photography systems possess numerous drawbacks and disadvantages in that they are unreliable and inconvenient in operation, frequently highly time consuming and otherwise leave much to be desired.

SUMMARY OF THE INVENTION

It is a principal object of the present invention to provide an improved photoflash photography apparatus.

Another object of the present invention is to provide an improved photoflash photography apparatus in which the photoflash light emission is automatically adjusted in accordance with the sensitivity of the film loaded in the camera.

Still another object of the present invention is to provide an improved film cartridge housing camera and photoflash unit in which the light output of the photoflash unit is automatically adjusted in accordance with the sensitivity of the film contained in the cartridge.

A further object of the present invention is to provide an apparatus of the above nature characterized by its reliability and precision, low cost, ease and convenience of use and great versatility and adaptability.

The above and other objects of the present invention will become apparent from a reading of the following description taken in conjunction with the accompanying drawings which illustrate preferred embodiments thereof.

In a sense the present invention contemplates the provision of an improved photoflash photography apparatus comprising a camera having a film cartridge receiving cavity, a film cartridge replaceably housed in the cavity and having detectable indicia varying in accordance with the sensitivity of the film contained in the cartridge, a photoflash unit coupled to the camera and having a variable light output and detecting means responsive to said indicia for varying the amount of the photoflash light output inversely of the sensitivity of the film contained in the cartridge.

The indicia may be of a physical nature such as a notch whose depth varies with the film sensitivity or a shoulder or finger whose position on the cartridge varies with the film sensitivity or the indicia may be of an electrical nature such as a resistor whose value varies with the film sensitivity. The amount of light emitted by the photoflash unit may be varied by varying the charge voltage on the photoflash unit discharge capacitor or by varying the capacitance of the capacitor such as by adding or removing an auxiliary capacitor from parallel connection with the main capacitor. Where the indicia are of a physical nature, the detecting means may include a detecting member which is moved to a position corresponding to the film sensitivity by sensing the position of the indicia such as the notch base or shoulder and operates a switch which varies the capacitance of the discharge capacitor bank or varies the charging voltage of the capacitor charging network by varying the value of a resistor network therein. On the other hand where the indicia are resistors the detecting means includes contacts separably coupling the resistor into the capacitor charging network to vary the charging voltage thereof.

With the improved apparatus briefly described above, merely by loading a film cartridge into the camera, the light output of the photoflash unit coupled to the camera is adjusted to compensate for the sensitivity of the film contained in the cartridge. The apparatus is highly reliable, of little additional cost, accurate, easy and convenient to use and of great versatility and adaptability.

DESCRIPTION OF THE PREFERRED EMBODIMENTS

Figure 1:
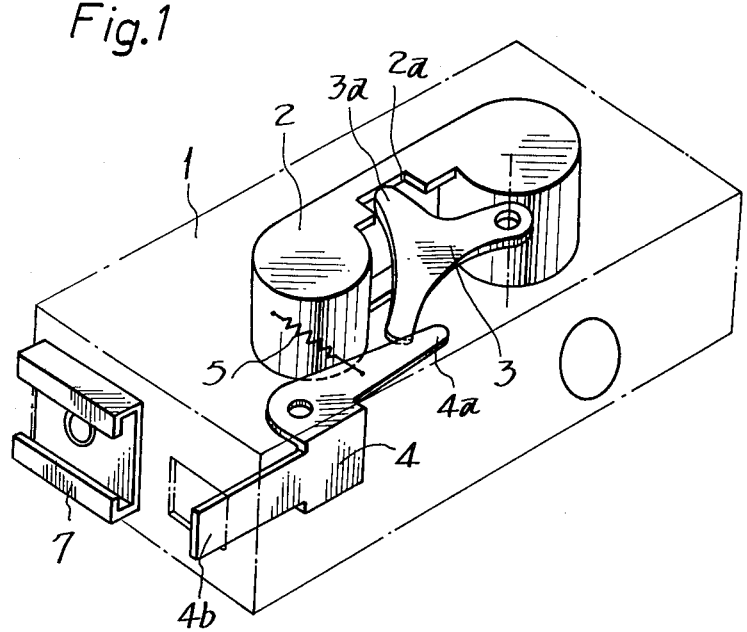
FIG. 1 is a perspective view of the components of the camera housed mechanisms in accordance with a preferred embodiment of the present invention.
Figure 2:
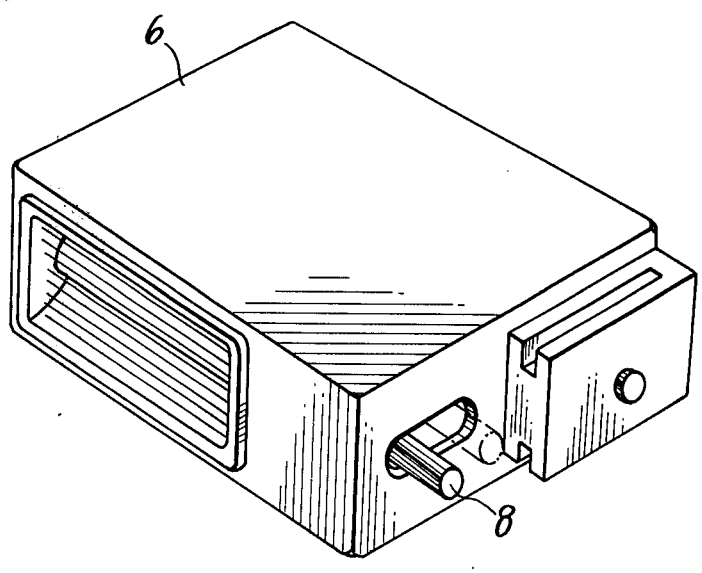
FIG. 2 is a perspective view of the photoflash unit thereof.
Figure 3:
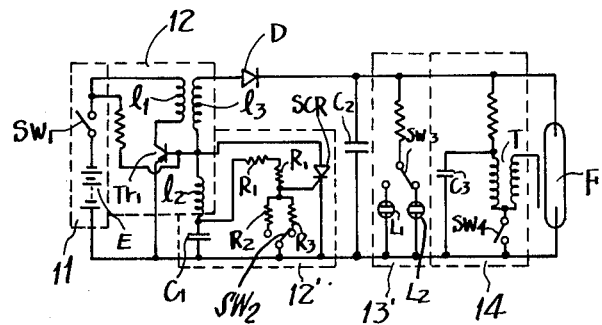
FIG. 3 is a circuit diagram of the photoflash charging and firing network.

Referring now to the drawings, particularly FIGS. 1 to 3 thereof which illustrate a preferred embodiment of the present invention, the reference numeral 1 generally designates a camera body in a cavity in which there is replaceably housed a film cartridge 2 provided with a cut-away portion or recess 2a having a depth commensurate with the sensitivity of the film contained in the respective cartridge and functioning as a film sensitivity information transmitting portion or indicia. A film sensitivity detecting lever 3 has a sensing portion or tip 3a which is adapted to engage the cut-away portion 2a of the film cartridge 2, the lever 3 being rotatable in the clockwise direction for an angle commensurate with the depth of the cut-away portion 2a. An operating lever 4 is normally urged to rotate in the counterclockwise direction by means of a spring 5, and bears against the film sensitivity detecting lever 3 at one end 4a of the operating lever 4. The other end 4b of the operating lever 4 protrudes externally through the wall of the camera body 1 and is adapted to engage a light-amount-control pin 8 extending from the electronic flash tube means or unit 6 when the flash tube means 6 is mounted by means of an accessory shoe 7 on the camera body 1.

Specifically, the control pin 8 is operably associated with a switch SW2 as shown in FIG. 3 such that when the control pin 8 is in the position shown by solid line in FIG. 2, the switch SW2 is connected to the side of a resistor R2 while the switch SW2 is connected to the side of a resistor R3, when the pin 8 is in the position shown by a broken line. As shown in FIG. 3, a power source battery E and a power source switch SW1 form a potential or current source portion or section 11. A transistor Tr1, intercoupled coils $l_1$, $l_2$, $i_3$ and a condenser C1 constitutes a known blocking oscillation circuit 12, while resistors R1, R2, R3, thyristor SCR constitutes a voltage regulating or timing circuit 12' adapted to control the period during which the voltage to which a main condenser C2 is charged with an output current from the oscillation circuit, the time period being varied depending on the resistor selected by the switch SW2, the resistance values of resistors R2, R3 being so determined as to provide a longer duration for a resistor R2 than when the resistor R3 is selected. The main or flash discharge condenser C2 for feeding a current to a photoflash tube F is charged by way of a rectifying diode D. Neon tubes $L_1$, $L_2$ are used for indicating purposes. The neon tube $L_1$ is so designed as to be lit when the main condenser C2 is charged to a given voltage level commensurate with the resistance of resistor R2, while the neon tube $L_2$ is so designed as to be lit when the main condenser C2 is charged to a voltage level commensurate with the resistance of resistor R3. A switch SW3 cooperates with the switch SW2 and is adapted to select the neon tube $L_1$ when the switch SW2 selects the resistor R2, and selects the neon tube $L_2$, when the switch SW2 selects the resistor R3. The switch SW3 forms an indicator portion 13 in cooperation with the neon tubes $L_1$, $L_2$. A condenser C3, transformer T and switch SW4 constitutes a trigger circuit for triggering the flash tube F. In this respect, the switch SW4 is adapted to cooperate in synchronism with a shutter provided within the camera 1 and connected to a flash tube firing circuit by way of the accessory shoe 7 or a synchro-cord.

When the film cartridge 2 which contains film of an ordinary sensitivity is loaded in the camera 1, then the film sensitivity detecting lever 3 is rotated in the clockwise direction with its sensing portion 3a engaging the cut-away portion 2a of the cartridge 2 so that the operating lever 4 is rotated in the counterclockwise direction to the position shown in FIG. 1, whereupon the control pin 8 of the flash tube means 6 assumes a position shown by a solid line. Accordingly, the switch SW2 selects the resistor R2 and the switch SW3 selects the neon tube $L_1$. As a result, the main condenser is charged for a longer duration, i.e., to a higher voltage level so that a large amount of light may be obtained or emitted from the flash tube F. In other word, the flash tube means may have a large guide number. On the other hand, when a film cartridge containing a high sensitivity film therein, is charged in the camera 1 with the depth of the indicia cut-away portion 2a of the cartridge being smaller than the depth of the indicia cut-away portion for use with a film of lower or ordinary sensitivity, there results a reduced angle of rotations of the film sensitivity detecting lever 3 and operating lever 4b, whereupon the control pin 8 assumes a position shown by broken line in FIG. 2, the switch SW2 selects the resistor R3, and the switch SW3 selects the neon tube $L_2$. As a result, the main condenser C2 is charged to a voltage level lower than that in the case of film of ordinary sensitivity, so that the amount of light emitted from the flash tube F is reduced with the accompanying reduction in a guide member.

Figure 4:
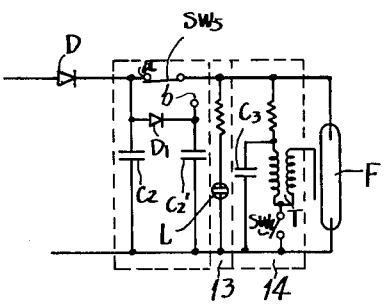
FIG. 4 is a circuit diagram of a part of a modified network.
Figure 5:
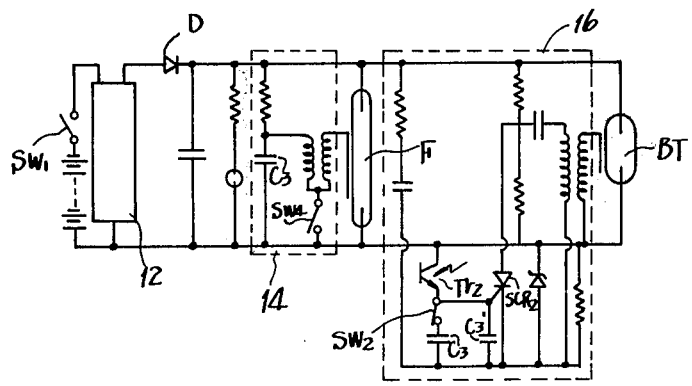
FIG. 5 is a view similar to FIG. 3 of a further embodiment of the present invention.

FIGS. 4 to 7 show various modifications of the means for changing the light emission amount or guide number of the flash tube by selecting or adjusting any element in the flash circuit. in the network illustrated in FIG. 4, when the switch SW5 is thrown to the side of a contact a, then the condenser C2 alone will contribute to emission of light of the flash discharge tube F, so that a smaller guide number is obtained. When the switch SW5 is, however, thrown to the side of a contact b, then two condensers C2, C2' will be connected in parallel with the flash tube F by way of diode D1, so that an increased guide number may be obtained. Meanwhile, the terminal voltage of the condensers remain unchanged, so that a single neon tube suffices for indicating the proper charge level. In FIG. 5 there is shown a flash circuit having an automatic light amount control circuit 16 which integrates the light reflected from an object being illuminated by the flash tube F and incident on a photosensitive transistor Tr2 and interrupts the emission of the light from the flash tube, when the integrated value reaches a given level. In this case, a condenser adapted to be charged with an output current from a photo-transistor Tr2 and to trigger the thyristor SCR 2 may be selected as one of condensers C3 and C3' which have different capacities. The condensers C3 and C3' are so selected that both C3 and C3', or C3' alone, may be connected with the photo-transistor Tr2. As gas discharge tube BT when fired is a discharge tube for bypassing current from the main condenser.

Figure 6:
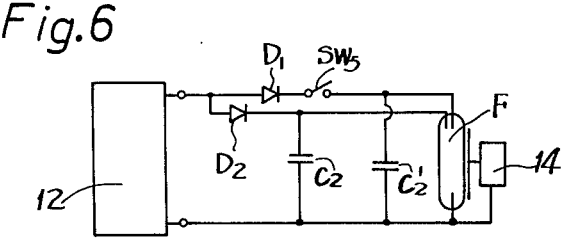
FIG. 6 is a circuit diagram of a photoflash network according to another embodiment of the present invention.

FIG. 6 shows a circuit which is intended to prevent destruction of the selector switch SW5 shown in FIG. 4 due to a large amount of current flowing therethrough when the condenser C2 or C2' is discharged. The switch SW5 is such as shown in FIG. 4. With this arrangement, the switch SW5 is positioned on the side of a charging circuit of the condenser C2' with the respective condensers being connected by way of a reverseflow-preventive diode D1 or D2 to the blocking oscillation circuit 12.

Each of the condensers C2 or C2' has one terminal thereof connected to a respective electrode of a pair of electrodes located at one end of a multi-electrode flash tube F, and the other terminal thereof connected to a common electrode at the opposite end of the flash tube.

It follows from this that only a small amount of charging current flows through the switch SW5 so that a simple switch of a small capacity is sufficient for use.

Figure 7:
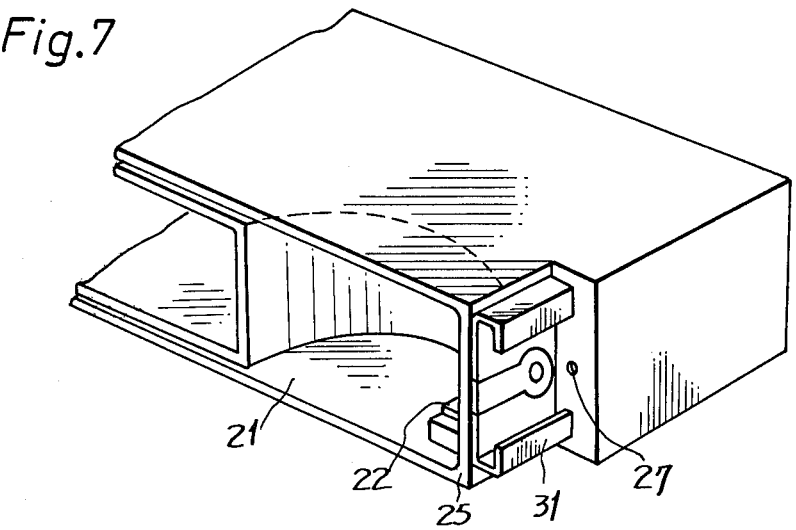
FIG. 7 is a fragmentary rear perspective view of the camera section of still a further embodiment of the present invention.
Figure 8:
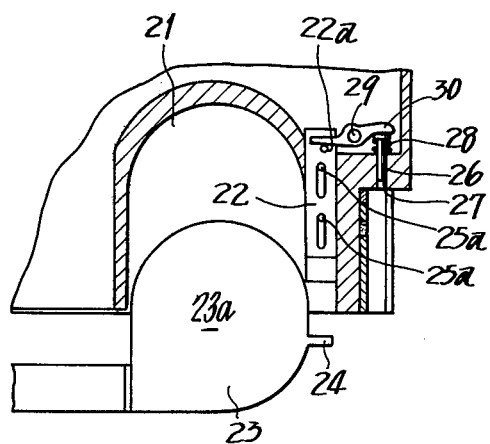
FIG. 8 is a horizontal medial sectional view of the section shown in FIG. 7 illustrating the insertion of an associated film cartridge.
Figure 9:
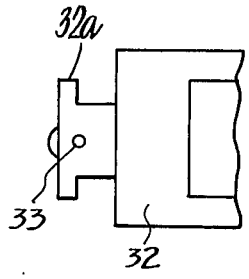
FIG. 9 is a fragmentary end view of the associated photoflash unit.

FIGS. 7 to 9 illustrate another embodiment for transmitting the film-sensitivity-information from the film cartridge in which a cartridge cavity or chamber 21 houses therein a film cartridge 23 having a projection 24 whose height from a rear surface 23a is commensurate with the sensitivity of the film housed in the cartridge. Provided on the side wall of the chamber 21 is a film-sensitivity detecting plate 22 which is slidably movable in the vertical direction of FIG. 8, i.e. in the direction of the film cartridge to be inserted. An operating pin 26 slidably engages a vertical bore 27 formed in the body of the camera and urged inwardly of the camera under the action of a spring 28. The operating pin 26 is operably associated with the film-sensitivity detecting plate 22 by means of an intermediate lever 30 which is pivotally supported by a shaft 29. Thus, when the detecting plate 22 is pushed into a camera, then part of the operating pin 26 will protrude outwardly from the camera body. When the accessory shoe 32a of flash tube unit or means 32 as shown in FIG. 9 is attached to accessory grip 31, then an opening 33 will be brought into register with the aforesaid bore in the camera body, and the operating pin 26 will engage the hole 33. The height h of the projection 24 of the film cartridge 23 is large for high sensitivity if film housed in the film cartridge 23, while the height h is small for low film-sensitivity film. In this respect, when a cartridge for high-sensitivity film is charged in a camera, the projection 24 will advance the detecting plate 22 to its retracted position, and the operating pin 26 will engage and advance in the hole 33 in the flash tube unit 32, thereby actuating the switch SW2 or SW5 alone or switches SW2 and SW3 in combination for the purpose of changing the amount of light being emitted from the flash discharge tube.

Figure 10:
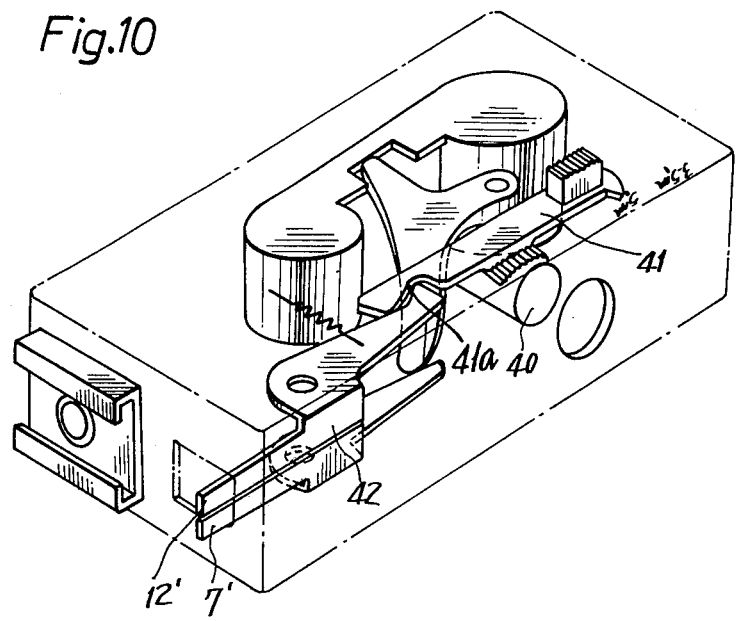
FIG. 10 is a view similar to FIG. 1 of another embodiment of the present invention.

FIG. 10 shows a modification of the embodiment of FIG. 1, wherein the amount of light emitted from the flash tube may be varied depending on the camera-object distance. In this respect, the arrangement of the aforesaid modifications is such that an extent of a picture taking lens 40 to be advanced is adjusted in a manner that the picture taking lens 40 is focussed on an object positioned at a close distance, by means of a cam portion 41a formed on one end of a focus adjusting member 41, then the second operating lever 42 will be rotated in the clockwise direction, and the control pin 8 of FIG. 2 will be shifted to a position shown by a broken line.

Figure 11:
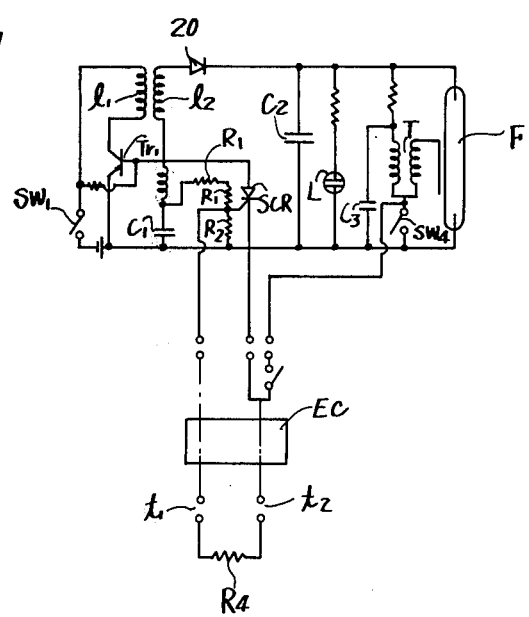
FIG. 11 is a circuit diagram of another embodiment of the present invention in which the film cartridge is provided with resistor indicia.

FIG. 11 illustrates a further embodiment of the invention in which the indicia or information of film sensitivity is conducted to the side of a camera in terms of resistance values. In this figure, the amount of light being emitted from the flash tube F may be varied, for example, in a manner as is adapted in the embodiment shown in FIG. 3. Specifically, resistor R4 is adapted to be connected to an exposure control circuit EC of a camera via contacts t1, t2. A flash-triggering synchro-switch SW4 has a ground terminal electrically connected to the flash tube means as well as to the terminal t2 of the aforesaid resistor R4. Another terminal of the resistor R4 is adapted to be connected to control terminal of a silicon controlled rectifier SCR in the timing or voltage regulator circuit of the flashing circuit, when the flash tube means is mounted on a camera. With the aforesaid arrangement, a guide number of the flash tube may be determined through a film sensitivity detecting member of a camera in practice, the contacts correspond to the terminals t1, t2, with the result that the amount of light commensurate with film sensitivity to be used may be obtained from the flash tube and the like. Thus, resistor R4 which is indicative of film sensitivity is carried by the cartridge and is coupled by way of mating contacts on the cartridge and in the camera cavity across control resistor R2 to vary the charge voltage according to film sensitivity.

As is apparent from the foregoing description of the flash tube according to the present invention, the amount of light being emitted from a flash tube may be automatically varied in accordance with film sensitivity, by mounting a film cartridge or container in a camera.

While there have been described and illustrated preferred embodiments of the present invention, it is apparent that numerous alterations, omissions and additions may be made without departing from the spirit thereof.

We claim:

1. A photoflash photography apparatus comprising a camera having a film cartridge receiving chamber, a film cartridge replaceably housed in said chamber and having detectable indicia varying in accordance with the sensitivity of the film contained in said cartridge, a photoflash unit coupled to the camera and having a variable light output and including a photoflash tube and at least a pair of storage capacitors dischargable through said tube to effect the emission of said photoflash light therefrom and control means responsive to said indicia for varying the amount of the light emittted from said photoflash unit inversely of the sensitivity of said film contained in said cartridge and including means for alternatively connecting one and both of said capacitors across said tube in response to said indicia.

2. The apparatus of claim 1 wherein one of said capacitors is connected across said tube and means including a switch transferrable between open and closed positions for connecting the other of said capacitors across said tube, said control means including means for transferring said switch between open and closed positions in response to said indicia.

3. The apparatus of claim 2 including a charging network and a diode connected between said switch and said charging network and oriented to permit the flow of only charging current from said charging network through said switch to said respective capacitor.

4. The apparatus of claim 3 including a diode connected between said capacitor connected across said tube and said charging network and oriented to permit the flow only of charging current from said charging network to said capacitor.

5. In combination with a camera, an apparatus for automatically setting the quantity of light emitted from an electronic flash tube comprising:

a film cartridge having a portion bearing information corresponding to the sensitivity of the film contained in the film cartridge;

a camera body including means for sensing said information when said film is loaded in the camera body; and an electronic flash device coupled to said camera and including an electronic flash tube; an electric charge storage network coupled to said flash tube; means for charging said storage network; and means for controlling the charge on said storage network deliverable to said flash tube in response to said cartridge film information and including switch means, said charge means including a plurality of main condensors selectively connectable via said switch means to said flash tube to energize the latter.

6. A combination as set forth in claim 5 said electric flash device further comprising and a plurality of diodes respectively connected between each said main condenser and said charging means, with the polarity to prevent current flow from each main condenser to said charging means.

7. In combination with a camera, an apparatus for automatically setting the quantity of light emitted from an electronic flash tube comprising:
 a film cartridge having a portion bearing information corresponding to the sensitivity of the film contained in the film cartridge;
 a camera body including means for sensing said information when said film is loaded in the camera body; and
 an electronic flash device coupled to said camera and including an electronic flash tube; an electric charge storage network coupled to said flash tube; means for charging said storage network; and means for controlling the charge on said storage network deliverable to said flash tube in response to said cartridge film information, said electric charge storage network comprising a plurality of capacitors and said control network comprising a switch for selectively operatively connecting said capacitors into said storage network in response to said information.

8. A combination for automatically setting the quantity of light to be emitted from an electric flash tube, said combination comprising:
 a film cartridge having a portion bearing information of sensitivity of film contained in the film cartridge;
 a camera body including means for sensing the information on said film cartridge when said film cartridge is loaded in the camera body;
 an electric flash device including
 an electric flash tube,
 a photocell responsive to the light incident thereon,
 a plurality of condensors,
 switching means for connecting selected of said condensors in circuit with said photocell in response to said sensing means, and
 means responsive to the charge on said selected condensor for controlling the quantity of light emitted by said flash tube.

* * * * *